(12) United States Patent
Casado et al.

(10) Patent No.: US 10,679,153 B2
(45) Date of Patent: Jun. 9, 2020

(54) COMPUTER-IMPLEMENTED METHOD AND SYSTEM FOR SHARING INFORMATION BETWEEN PASSENGERS AND AIR TRAFFIC MANAGEMENT STAKEHOLDERS

(71) Applicant: The Boeing Company, Chicago, IL (US)

(72) Inventors: Enrique Casado, Madrid (ES); Pablo Costas, Madrid (ES)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 15/468,787

(22) Filed: Mar. 24, 2017

(65) Prior Publication Data
US 2017/0293867 A1    Oct. 12, 2017

(30) Foreign Application Priority Data

Apr. 7, 2016    (EP) .................................... 16382152

(51) Int. Cl.
*G06Q 10/00*    (2012.01)
*G06Q 10/02*    (2012.01)
(Continued)

(52) U.S. Cl.
CPC .......... *G06Q 10/025* (2013.01); *G06Q 30/02* (2013.01); *G08G 5/003* (2013.01); *G08G 5/0021* (2013.01); *H04W 4/90* (2018.02)

(58) Field of Classification Search
CPC ........ G06F 15/16; G06Q 10/02; G06Q 50/30; H04W 24/00
(Continued)

(56) References Cited

U.S. PATENT DOCUMENTS 6,259,405 B1 *    7/2001    Stewart ............. H04M 15/8033
                                                                342/457
6,910,628 B1 *    6/2005    Sehr ....................... G06Q 10/02
                                                                235/384
(Continued)

FOREIGN PATENT DOCUMENTS

CN    103489093 A    1/2014

OTHER PUBLICATIONS

SITA "Connecting to Passengers—Are Beacons the Breakthrough?", Mar. 31, 2014, 4 pages, Retrieved Jul. 6, 2016 http://www.sita.aero/resources/type/white-papers/ibeacons.
(Continued)

*Primary Examiner* — Oluseye Iwarere
(74) *Attorney, Agent, or Firm* — Yee & Associates, P.C.

(57) ABSTRACT

A computer-implemented method and a system for providing passenger information performing the tasks of sending, from a passenger electronic device (110), personal data, device geolocation and device time-stamp information; obtaining the passenger itinerary and confirming passenger identity, by a managing unit (206), based upon a match between the personal data, passenger electronic device geolocation and time-stamp; information contained in the obtained passenger itinerary; accessing to updated air traffic information relevant to the passenger upon confirming the passenger identity and sending, by the managing unit (206), a passenger report comprising flight status information for display on the passenger electronic device (110).

20 Claims, 3 Drawing Sheets

(51) Int. Cl.
  *G06Q 30/02* (2012.01)
  *H04W 4/90* (2018.01)
  *G08G 5/00* (2006.01)

(58) Field of Classification Search
  USPC .................. 709/207; 705/6, 5; 455/456.1
  See application file for complete search history.

(56) References Cited

U.S. PATENT DOCUMENTS

| | | | | |
|---|---|---|---|---|
| 7,802,724 | B1* | 9/2010 | Nohr | G07C 9/00111 235/384 |
| 8,358,609 | B1* | 1/2013 | Cona | G01C 21/3415 370/315 |
| 8,463,286 | B2* | 6/2013 | Maranhas | G06Q 10/02 455/418 |
| 9,367,217 | B2* | 6/2016 | Moore, Jr. | G06Q 10/02 |
| 9,686,386 | B1* | 6/2017 | Kubasik | G06Q 10/02 |
| 2002/0100803 | A1* | 8/2002 | Sehr | G06Q 10/02 235/384 |
| 2003/0055689 | A1* | 3/2003 | Block | G06Q 20/206 705/5 |
| 2003/0085808 | A1* | 5/2003 | Goldberg | G06Q 10/06 340/531 |
| 2004/0019051 | A1 | 1/2004 | Bekkers | |
| 2004/0198348 | A1* | 10/2004 | Gresham | H04B 7/18506 455/431 |
| 2005/0216139 | A1* | 9/2005 | Laughlin | G06Q 30/00 701/3 |
| 2006/0059024 | A1* | 3/2006 | Bailey | G06Q 10/02 705/5 |
| 2006/0155591 | A1* | 7/2006 | Altaf | G06Q 10/02 705/5 |
| 2009/0187640 | A1* | 7/2009 | Delia | G06Q 10/00 709/219 |
| 2009/0265552 | A1* | 10/2009 | Moshir | H04L 63/0464 713/168 |
| 2009/0276250 | A1* | 11/2009 | King | G06Q 10/02 705/5 |
| 2010/0076843 | A1* | 3/2010 | Ashton | G06Q 30/0253 705/14.51 |
| 2010/0190510 | A1 | 7/2010 | Maranhas et al. | |
| 2010/0268570 | A1* | 10/2010 | Rodriguez | G06Q 10/025 705/7.13 |
| 2011/0225257 | A1* | 9/2011 | Tilden | G06F 16/9535 709/207 |
| 2011/0231212 | A1* | 9/2011 | Hurley | G06Q 10/02 705/5 |
| 2011/0288768 | A1* | 11/2011 | Stefani | G06Q 30/0281 701/533 |
| 2014/0278615 | A1* | 9/2014 | Ince | G06Q 10/025 705/6 |
| 2014/0364148 | A1* | 12/2014 | Block | H04W 4/02 455/456.3 |
| 2015/0227727 | A1* | 8/2015 | Grigg | G06F 21/31 726/4 |
| 2015/0269699 | A1* | 9/2015 | Burgess | G06Q 50/265 705/325 |
| 2015/0289087 | A1* | 10/2015 | Oki | H04W 4/02 705/6 |
| 2015/0351066 | A1* | 12/2015 | Lauer | H04W 60/04 455/405 |
| 2016/0117616 | A1* | 4/2016 | Wang | G06Q 10/025 705/6 |
| 2016/0117617 | A1* | 4/2016 | Peters | G06Q 10/025 705/6 |
| 2016/0117618 | A1* | 4/2016 | Wang | G06Q 10/025 705/6 |
| 2016/0117619 | A1* | 4/2016 | Ning | G06Q 10/025 705/6 |
| 2017/0129603 | A1* | 5/2017 | Raptopoulos | B64C 39/024 |
| 2017/0169528 | A1* | 6/2017 | Kundu | G06Q 50/14 |
| 2017/0228667 | A1* | 8/2017 | Duschl | G06Q 10/025 |
| 2017/0268891 | A1* | 9/2017 | Dyrnaes | G01C 21/3423 |
| 2017/0293867 | A1* | 10/2017 | Casado | G06Q 10/025 |

OTHER PUBLICATIONS

Denning et al., "Location-Based Authentication: Grounding Cyberspace for Better Security", Computer Fraud & Security, Oxford, GB, Elsevier Science Ltd, Feb. 1, 1996, pp. 12-16.
European Search Report, dated Jan. 8, 2016, Regarding Application No. 16382152.3, 6 pages.
European Search Report, dated Sep. 15, 2016, Regarding Application No. 16382152.3, 6 pages.
Intellectual Property Office of Singapore Search Report and Written Opinion, Translation Only, dated Jan. 17, 2020, regarding Application No. 10201700597Q, 8 pages.
Canadian Intellectual Property Office Office Action and Examination Search Report, dated Apr. 2, 2020, regarding Application No. 2,957,888, 6 pages.

* cited by examiner

COMPUTER-IMPLEMENTED METHOD AND SYSTEM FOR SHARING INFORMATION BETWEEN PASSENGERS AND AIR TRAFFIC MANAGEMENT STAKEHOLDERS

BACKGROUND INFORMATION

1. Priority Information

This application claims priority to European patent application 16382152.3, filed Apr. 7, 2016.

2. Field

The present disclosure is comprised in the field of telecommunication involving flight passengers. In particular, it relates to securely exchanging information via System Wide Information Management (SWIM).

3. Background

It is observed that there is very limited real-time communication between passengers and airlines which can provide high benefits to both parties.

Some third party companies currently offer limited access to flight information to passengers. For instance, some uncertainty parameters influence the accuracy of departure and arrival data provided to the passengers. As a result, available information comprises purely estimated times of arrival and departure, and it is not particularized to passengers' status. There is reduced information exchange before, during and after the flight. This is undesirable, especially when passengers are connecting flights from different operators. This reduced access to information and limited customization often results in ineffective assistance to passengers.

A need thus exists for improving passengers' experience by offering services customized to his location and situation using shared flight-related information. Therefore, an enhanced assistance may be provided to passengers to help them in case of incident, connection lost, baggage claim, and the like.

On the other side, airlines and Air Navigation Service Providers (ANSP) can also take advantage from this communication channel. Information generated by or obtained from passengers' devices may be used as an additional source of information. It may be useful to verify a particular event or enhance the description of a situation (e.g. an emergency).

SUMMARY

Generally speaking, the present disclosure relates to a system and a method that enable real-time communication between passengers and SWIM infrastructure from door to door.

A real-time-connection service-oriented architecture can be implemented to share information between passengers' electronic devices and SWIM infrastructure. To that purpose the present disclosure makes use of System Wide Information Management (SWIM). SWIM includes standards, infrastructure and governance enabling the management and exchange of Air Traffic Management (ATM) related information.

Currently, ATM information is available via SWIM to several stakeholders: aircraft, airports, air traffic controllers and air navigation service providers, airline operation centers, military operation centers, flow management centers and weather service providers. However, at present, the passengers cannot connect to SWIM infrastructure by any means.

It is therefore an aspect of the present disclosure to provide an infrastructure for Passengers Access to SWIM (PAtS), in which access may be in a bidirectional way.

The proposed system and method may enable downlink and uplink of tailored, digital information from and to passengers' electronic devices using a dedicated interface to the SWIM infrastructure upon validating passenger identity.

It is another aspect of the present disclosure to increase or improve the overall functionalities of SWIM by using information from passengers using their electronic devices.

The services and information offered or available through the passenger access device may be based upon the passengers' device identifier (if available), geolocation, itinerary, and other time and location data.

One of the common difficulties associated with providing information to passengers on specific services is being able to locate relevant information according to the passenger's current location.

It is a further aspect of the present disclosure to provide information based on itinerary. The itinerary may include the passenger name or other identifying information, the time and location of updated key events including aircraft boarding, departure, landing, and de-boarding, as well as itinerary changes requested by the passenger and those caused by airline and air-traffic events (e.g. delays, diversions, and cancelations.)

Further objects and advantages of the present invention will be apparent from the following description, reference being made to the accompanying drawings wherein preferred embodiments of the invention are clearly illustrated.

BRIEF DESCRIPTION OF THE DRAWINGS

A series of drawings which aid in better understanding the disclosure and which are presented as non-limiting examples and are very briefly described below.

DETAILED DESCRIPTION

By enabling passengers' access to SWIM, a bidirectional communication is established. Valuable information may be exchanged between passengers and SWIM stakeholders. SWIM information may be enriched from passengers' information and passengers may benefit from the access to the SWIM information.

Although the list of possible feature is almost unlimited, next list gathers a preliminary set of main features that may be implemented in the Passengers Access to SWIM (PAtS):

Passenger no-show information sharing.
Passenger baggage and weight information can be shared before check-in.
Passenger position in the airport, useful for instance in case of gate change.
Electronic Individual Last call.
Exploitation of passengers' GPS geolocation enabled by mobile devices.
Real time updated information about flight connections.

Optimization of flight connections based on real time flight status.

Overall system optimization due to passenger geolocation monitoring.

Security. Hijacking report by passengers onboard.

Figure 1:
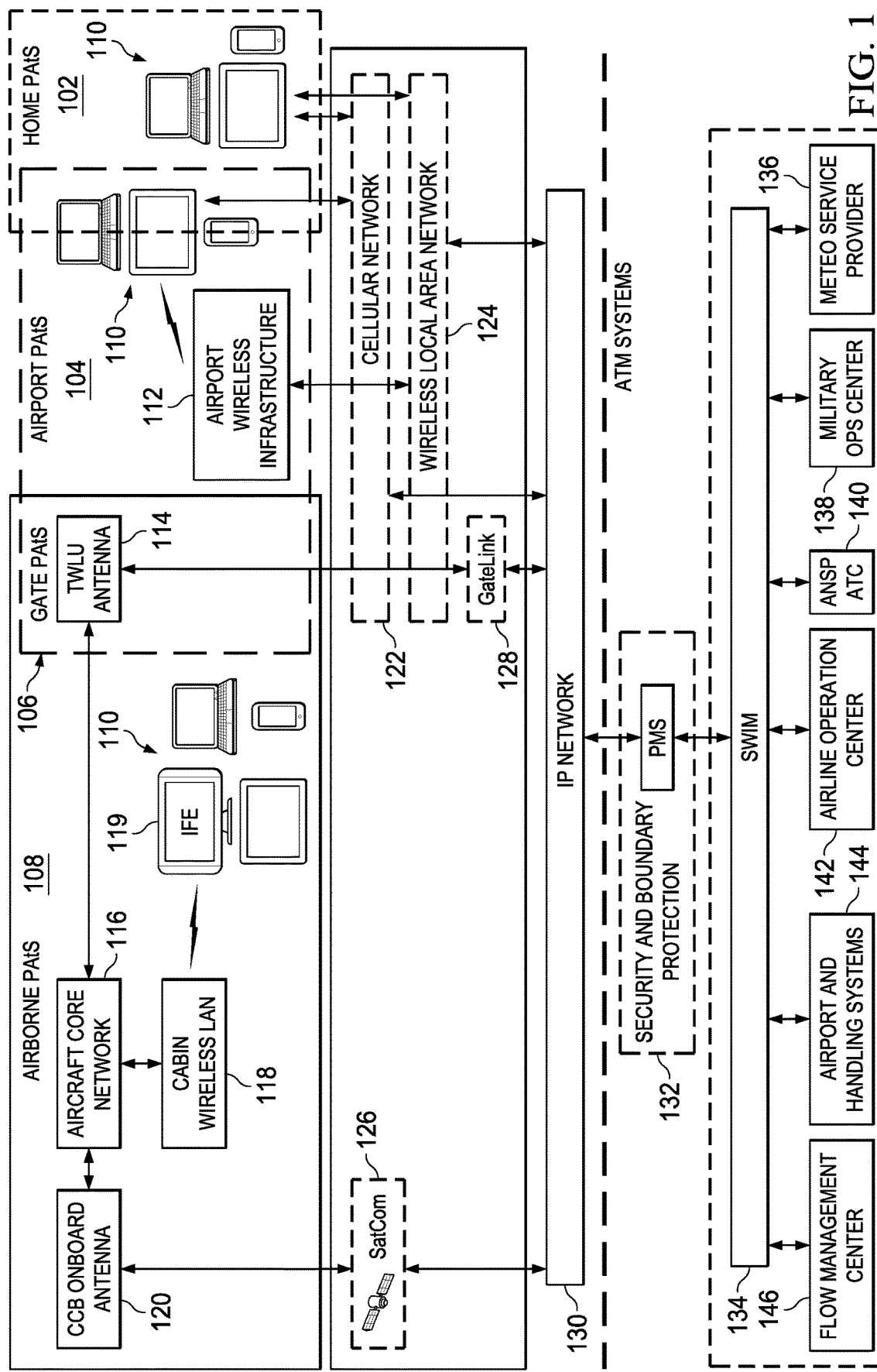
FIG. 1 schematically shows passengers' connectivity to SWIM infrastructure.

FIG. 1 shows how the passengers get access to the SWIM network by using different protocols through the Passenger Management System 132 (PMS).

Home PAtS 102: The passengers' connection to the IP network can be obtained through a wired/wireless access point at home or through a LTE network 122 access point.

Airport PAtS 104: Passengers at the airport. The connection to the IP network can be obtained through the Airport wireless network 112 or through a LTE network 122 access point.

Gate PAtS 106: Passengers at the boarding gate or onboard (airplane at the platform). The connection to the IP network can be obtained through a LTE network 122 access point or through a gatelink 128, that is a wireless communication link for on-ground aircraft wireless communication (e.g. according to standard ARINC 822).

Airborne PAtS 108: Passengers are onboard and the connection to the IP network can be obtained through the cabin wireless Local Area Network 118 by means of the Inflight Entertainment System (IFE) 119 or the passengers' electronic device 110.

The passenger electronic device 110 may be a desktop computer, laptop computer, tablet, cell phone, in-flight entertainment unit or other network enabled device.

In order to offer a proper protection for SWIM sensitive information, operations and SWIM stakeholders, the passenger's connection to SWIM needs to be controlled and restricted. To this end, a Passenger Management System (PMS) 132 provides an interface that defines and establishes connections between the passenger and the SWIM infrastructure 134, assuring security, permission grant management and boundary protection by decoupling the SWIM network from the IP network used by the passengers.

The PMS 132 has the capability of connecting a passenger's electronic device 110 with multiple SWIM infrastructures as depicted in FIG. 1. Among others, infrastructures such as Meteorological Service Providers 136, Military Operations Center 138, Air Traffic Control (ATC) 140, Airline Operation Center 142, Airport & Handling Systems 144 and Flow Management System 146.

On the other hand, the PMS 132 publishes passengers' data which may be exploited by dedicated SWIM agents. The PMS 132 may provide such information to the SWIM infrastructure.

Establishing a bidirectional information flow provides an unprecedented capability which enables multiple out-of-the-box functionalities to any SWIM stakeholder.

Figure 2:
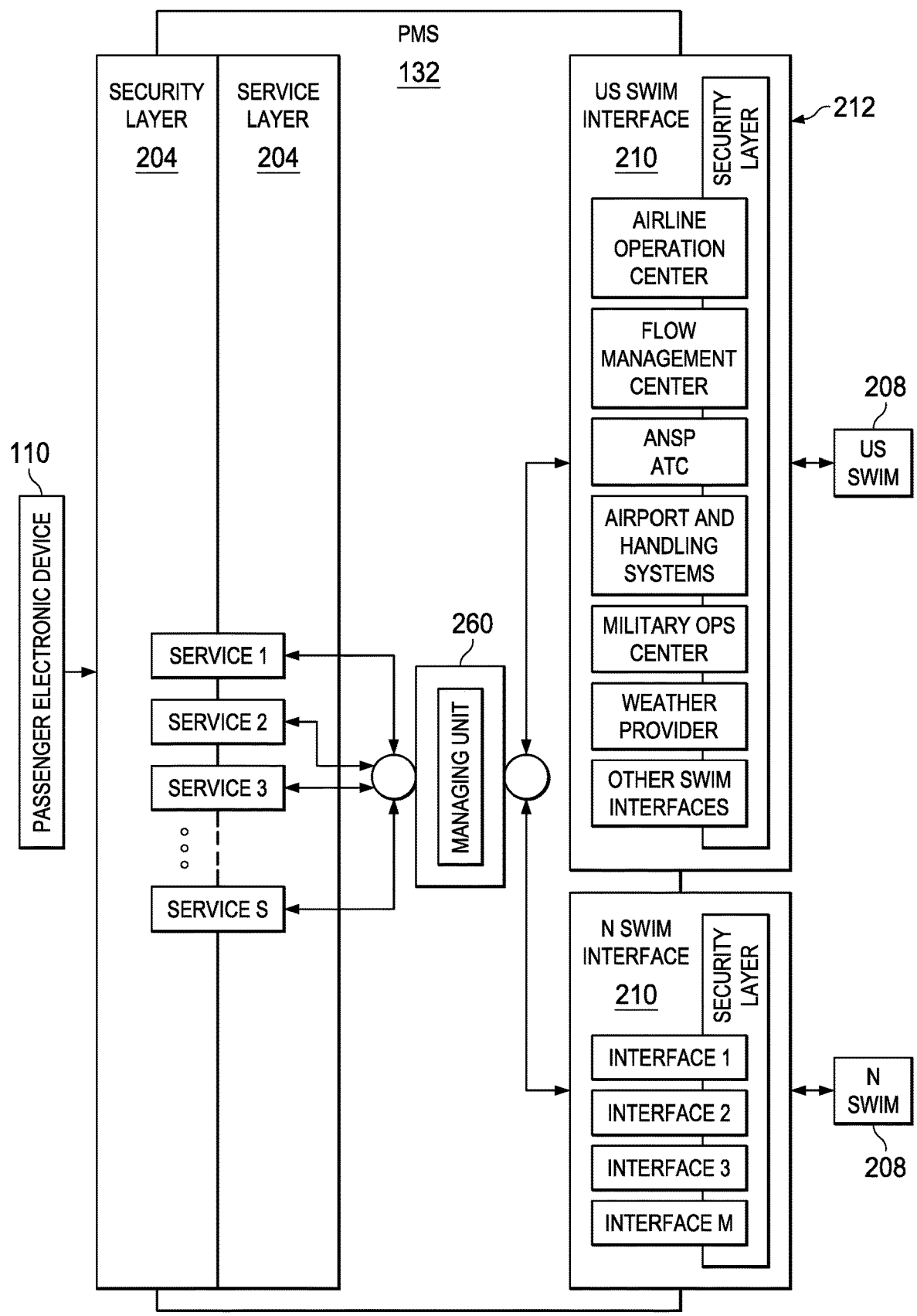
FIG. 2 schematically shows Passenger Management System (PMS) design.

FIG. 2 depicts a proposed design of the PMS 132. The main defined interfaces are:

Passenger Security Layer 202: Passenger secured (signed and encrypted) information with encapsulated service call request/reply.

Service Layer 204: Particular request/reply service, including passenger's information or SWIM information tailored to the passenger's requirements. Any possible service (Service 1, 2, . . . , S) is required to match the software implementation of system features. Possible services are shown below:

Passenger no-show information service.
Passenger baggage and weight information service.
Passenger position at airport sharing service.
Electronic Last call service.
Position calculated using GPS enabled mobile device management service.
Flight connections service.
Flight status service.

Managing Unit 206: Main algorithmic used for managing the passenger requests or the SWIM queries, by capturing, storing and processing the data available through the bidirectional flow of information. The Managing Unit 206 merges and fuses information from different SWIM implementations to provide the passenger with the expected information. The accessibility to the information is transparent to the end user, although internally the PMS 132 requires managing information from different sources.

SWIM Security Layer 212: Implements encryption and signing algorithms needed to secure requests for a particular SWIM implementation.

SWIM Interface 210: access implementation that includes communications, protocols and applications needed to get access to a particular SWIM service on a particular SWIM implementation.

The implementation of the PMS 132 is compliance with all particular implementations of the SWIM paradigm, especially the US SWIM 208, European SWIM and Australian SWIM.

In connection with the secure access to SWIM, the present embodiment may take advantage of the fact that most airlines offer electronic ticketing. The passenger having an electronic flight ticket may provide some information using an electronic device to easily get online check-in and receive his electronic boarding pass to gain entrance to the aircraft at the gate.

The electronic flight ticket may facilitate the validation or authentication of passengers when accessing to SWIM. Not only passenger identity is included in the electronic flight ticket, some other important personal information can be extracted therefrom as well. As a minimum, the electronic flight ticket comprises the passenger identity, the flight identification, and the date and scheduled time of departure. In particular, the passenger's itinerary is important to offer valuable information as indicated above.

Once the passenger is correctly identified, information can be offered that is specific to that passenger's location, itinerary.

As a way of further examples, the passenger using his electronic device may request change of seat, change of flight, or even change of airline. In response, the passenger may receive optional recommendations for reservations. Furthermore, in response to changes in their reservations additional charges or refunds against their credit card may be received. Advantageously, the passenger may make changes to rental car reservations, rail reservations, hotel accommodations, etc.

Figure 3:
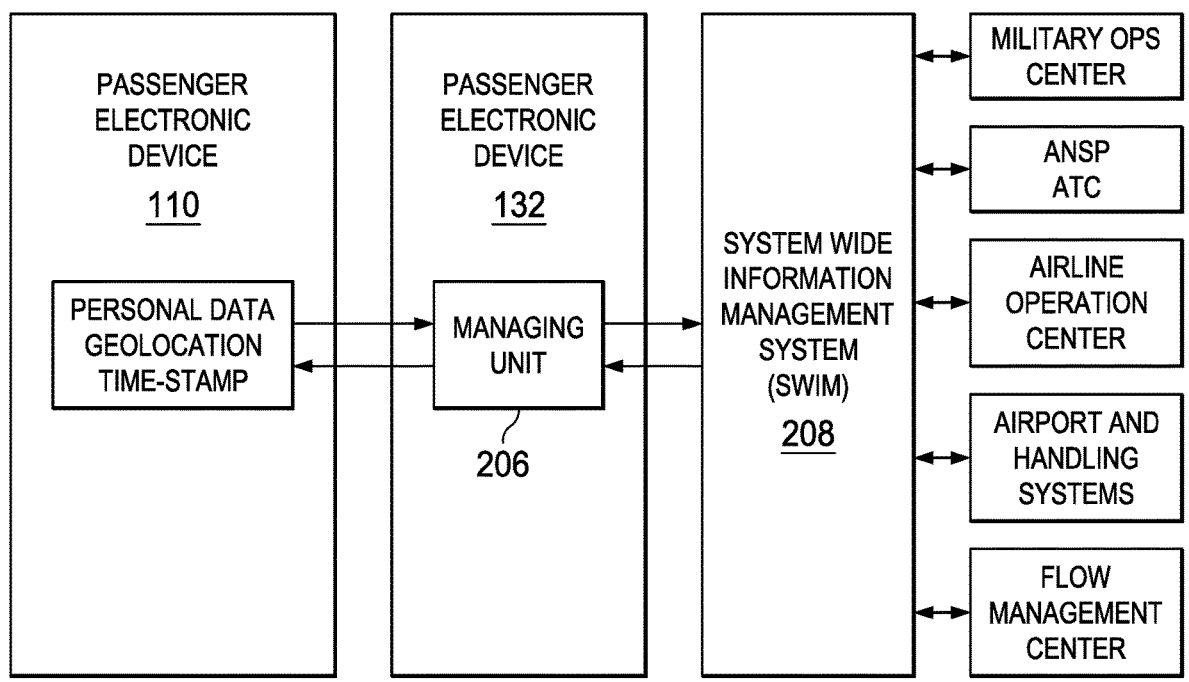
FIG. 3 shows a block diagram.

FIG. 3 depicts for a better understanding a simplified block diagram of main components showing their connections, relationships and functions that may be implemented in the systems and methods described in this document. A passenger electronic device 110 connects to the Managing Unit 206 included in PMS 132 and provides with personal data, device geolocation and device time-stamp information. The Managing Unit 206 uses these as credentials for authenticating the passenger prior to access to SWIM 208 to retrieve updated air traffic information relevant to the passenger, in particular regarding itinerary to produce a report to be displayed on the passenger electronic device 110.

Likewise, the passenger may provide or share useful information to be available to conventional SWIM stakeholders.

These and other features, functions, and advantages that have been discussed can be achieved independently in various embodiments or may be combined in yet other embodiments.

What is claimed is:

1. A passenger management system (PMS) for providing passenger information to a passenger, the system comprising:
 a user interface configured to receive at least personal data, device geolocation of a passenger electronic device, and device time-stamp information from a passenger electronic device; and
 one or more processors implementing a managing unit communicatively coupled to the user interface and configured to obtain a passenger itinerary and to confirm a passenger identity based upon a match between the personal data, the device geolocation, and the device time-stamp information received from the passenger electronic device, and information contained in the passenger itinerary, the managing unit further configured to assure security, permission, grant management and boundary protection to a System Wide Information Management (SWIM) infrastructure, the managing unit further configured to access updated air traffic information relevant to the passenger upon confirming the passenger identity and to send a passenger report to the passenger electronic device, the passenger report comprising flight status information for display on the passenger electronic device generated by accessing he SWIM infrastructure.

2. The system of claim 1, wherein the SWIM infrastructure comprises multiple disparate infrastructures.

3. The system of claim 2, wherein the managing unit is further configured to send an automatic notification of events relevant to the passenger based upon a recent geolocation of the passenger, a present geolocation of the passenger, and an inference of a future geolocation of the passenger of passenger's geolocation.

4. The system of claim 3, wherein the passenger report sent to the passenger further comprises at least one of the following information:
 passenger baggage weight, passenger baggage location, a passengers' position at airport, an electronic last call, and a booked connecting flight.

5. The system of claim 4, wherein the managing unit is further configured to send an input request to the passenger electronic device for updating data of SWIM infrastructure or for reporting an emergency.

6. The system of claim 5, wherein the passenger electronic device is further configured to receive an electronic airline ticket and to retrieve passenger identification and the passenger itinerary therefrom.

7. The system of claim 6, wherein the passenger electronic device is selected from the group consisting of: a home computer, an office computer, a laptop computer, a tablet computer, a cell phone, a smart watch, and an in-flight entertainment unit.

8. A method, comprising:
 a computing device providing passenger information to a passenger by the computing device:
  sending, to a passenger electronic device, at least personal data, a device geolocation of the passenger electronic device, and device time-stamp information;
  implementing a managing unit to obtain a passenger itinerary and confirm passenger identity based upon a match between the personal data, the device geolocation, and the device time-stamp information, and information contained in the passenger itinerary;
  accessing updated air traffic information relevant to the passenger upon confirming the passenger identity, wherein accessing the updated air traffic information comprises accessing a System Wide Information Management (SWIM) infrastructure and assuring security, permission, grant management and boundary protection to the SWIM infrastructure; and
  sending a passenger report comprising flight status information for display on the passenger electronic device.

9. The method of claim 8, wherein the SWIM infrastructure comprises multiple disparate infrastructures.

10. The method of claim 9, wherein the managing unit is further configured to send an automatic notification of events relevant to the passenger based upon a recent geolocation of the passenger, a present geolocation of the passenger, and an inference of a future geolocation of the passenger, of passenger's geolocation.

11. The method of claim 10, wherein the passenger report sent to the passenger further comprises at least one of the following information:
 passenger baggage weight, passenger baggage location, a passengers' position at an airport, an electronic last call, and a booked connecting flight.

12. The method of claim 11, wherein the managing unit is further configured to send an input request to the passenger electronic device for updating data of a SWIM infrastructure or for reporting an emergency.

13. The method of claim 12, wherein the passenger electronic device is further configured to receive an electronic airline ticket and to retrieve passenger identification and the passenger itinerary therefrom.

14. The method of claim 12, wherein the device geolocation is determined by at least one of:
 a global positioning system circuitry in the passenger electronic device, an IP address of the passenger electronic device, or by triangulation.

15. A computer program product, comprising:
 a non-transitory, computer-readable medium including instructions, which when executed by a processor, causes the processor to provide passenger information to a passenger, the instructions comprising:
 first program code for sending, to a passenger electronic device, at least personal data, a device geolocation of the passenger electronic device, and device time-stamp information;
 second program code for obtaining a passenger itinerary and confirming passenger identity, by a managing unit, based upon a match between the personal data, the device geolocation, and the device time-stamp information, and information contained in the passenger itinerary;
 third program code for accessing updated air traffic information relevant to the passenger upon confirming the passenger identity, wherein accessing the updated air traffic information comprises accessing a System Wide Information Management (SWIM) infrastructure and assuring security, permission, grant management and boundary protection to the SWIM infrastructure; and
 fourth program code for sending, by the managing unit, a passenger report comprising flight status information for display on the passenger electronic device.

16. The computer program product of claim 15, wherein the SWIM infrastructure comprises multiple disparate infrastructures.

17. The computer program product of claim 15 wherein the managing unit is configured to send an automatic notification of events relevant to the passenger based upon a recent geolocation of the passenger, a present geolocation of the passenger, and an inference of a future geolocation of the passenger.

18. The computer program product of claim 15, wherein the passenger report further comprises at least one of the following information:
   passenger baggage weight, passenger baggage location, a passengers' position at an airport, an electronic last call, and a booked connecting flight.

19. The computer program product of claim 15, wherein managing unit is configured to send an input request to the passenger electronic device for updating data of a SWIM infrastructure or for reporting an emergency.

20. The computer program product of claim 15 wherein the passenger electronic device is configured to receive an electronic airline ticket and to retrieve passenger identification and the passenger itinerary therefrom.

\* \* \* \* \*